March 9, 1926.
T. J. FLESHER
1,575,984
BULL WHEEL AND THE LIKE
Filed Jan. 30, 1925    2 Sheets-Sheet 1
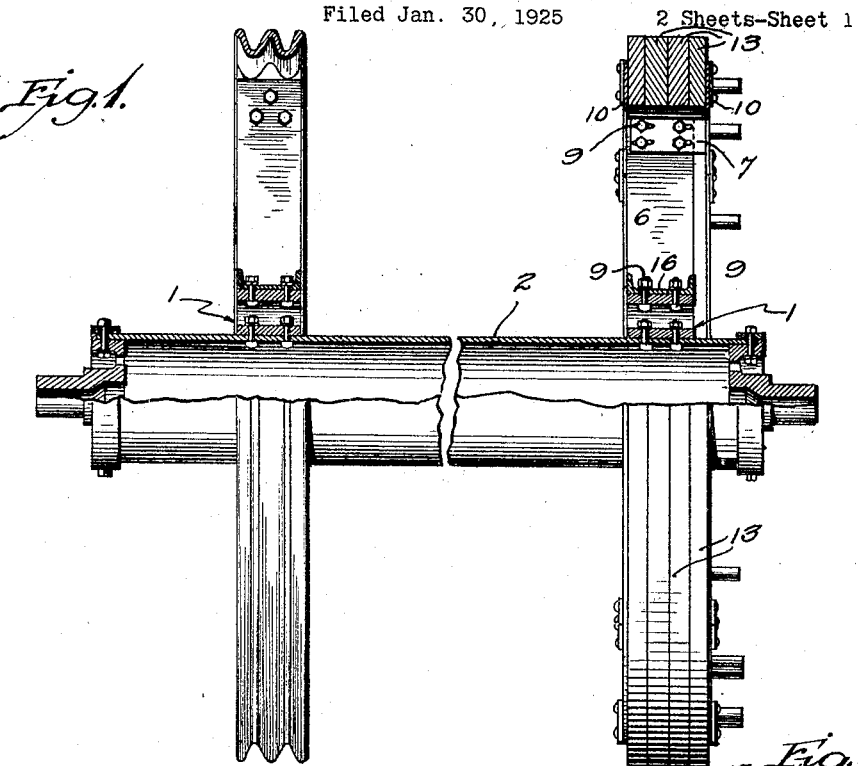
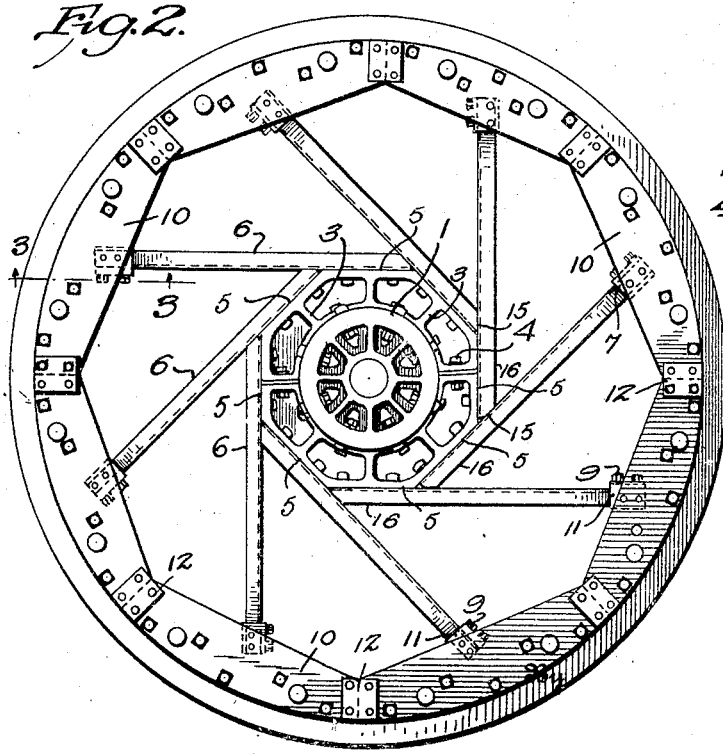
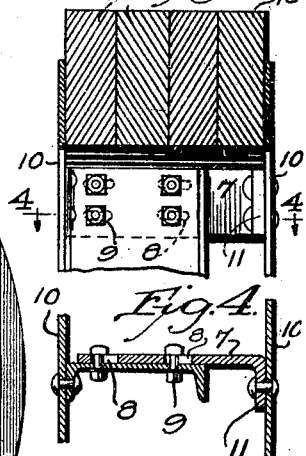
Inventor
T. J. FLESHER
Attorney March 9, 1926.  1,575,984
T. J. FLESHER
BULL WHEEL AND THE LIKE
Filed Jan. 30, 1925  2 Sheets-Sheet 2
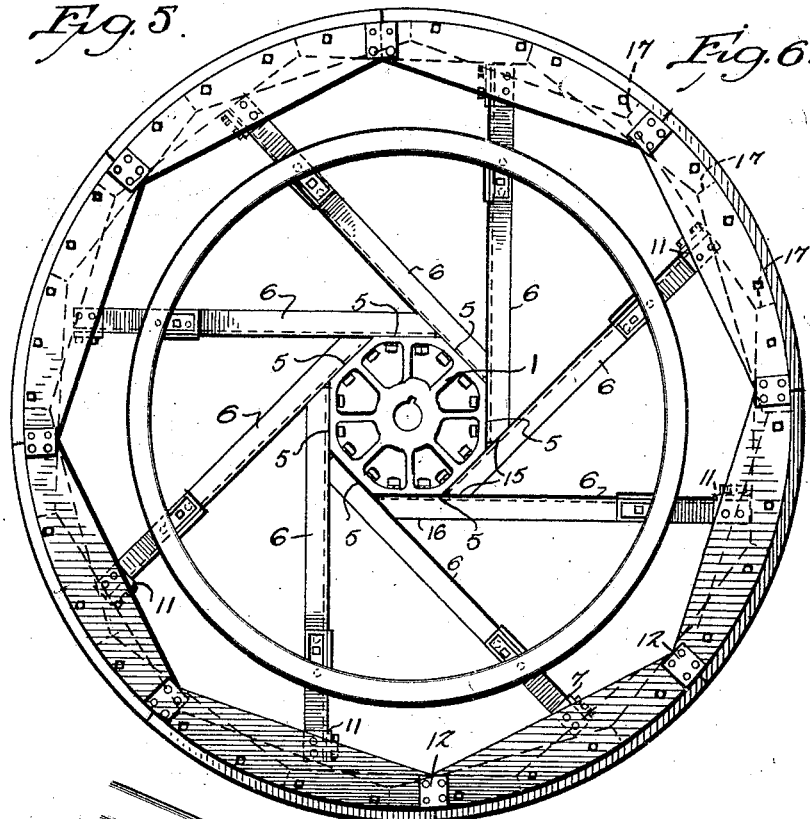
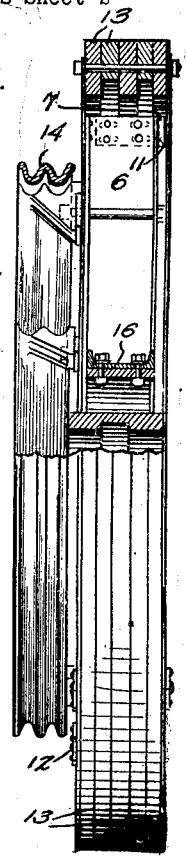
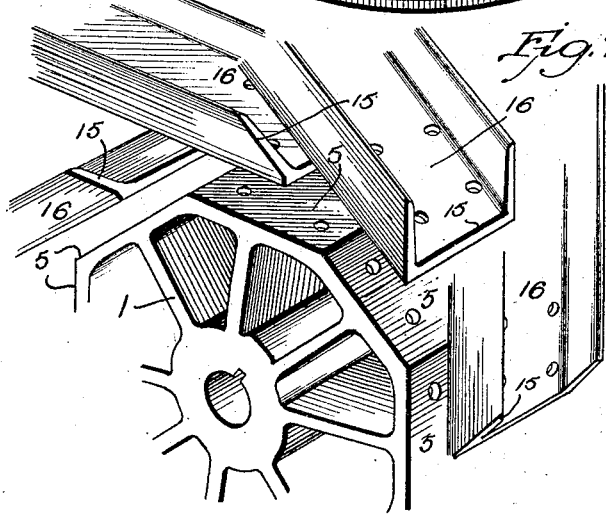
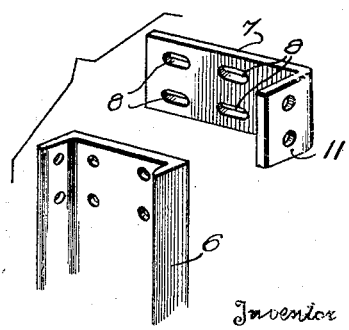
Inventor
T. J. FLESHER
By Ch. Parker
Attorney Patented Mar. 9, 1926.

1,575,984

UNITED STATES PATENT OFFICE.

THOMAS JOHN FLESHER, OF PARKERSBURG, WEST VIRGINIA, ASSIGNOR TO THE PARKERSBURG RIG & REEL COMPANY, OF PARKERSBURG, WEST VIRGINIA, A CORPORATION OF WEST VIRGINIA.

BULL WHEEL AND THE LIKE.

Application filed January 30, 1925. Serial No. 5,821.

*To all whom it may concern:*

Be it known that I, THOMAS J. FLESHER, a citizen of the United States, residing at Parkersburg, in the county of Wood and State of West Virginia, have invented certain new and useful Improvements in Bull Wheels and the like, of which the following is a specification.

This invention relates to bull wheels and the like, and more particularly to the provision of means for assembling and adjusting bull wheels, calf wheels, band wheels, and the like.

An object of the invention is to provide a construction in which the wheel may be readily assembled.

A further object is the provision of means for tightening or adjusting the wooden band or periphery of the wheel to take up the band when it becomes loose due to drying or shrinking.

In the accompanying drawings, I have shown several embodiments of the invention. In this showing:

Figure 1 is a sectional view of a shaft showing a bull wheel arranged thereon,

Figure 2 is a side elevation of the bull wheel,

Figure 3 is a detailed sectional view on line 3—3 of Figure 2,

Figure 4 is a similar view on line 4—4 of Figure 3,

Figure 5 is a side elevation of a band wheel,

Figure 6 is an end elevation, partly in section,

Figure 7 is a detail perspective view of the hub and the inner ends of the spokes, and, Figure 8 is a detail perspective view of the outer end of the spokes and a portion of the rim or felly disassembled.

Referring to Figures 1 to 4 of the drawings, the reference numeral 1 designates generally a hub which is adapted to be arranged on a shaft 2 in the usual manner and which is provided with a plurality of radiating members 3. As shown, the hub is formed in two sections, which are secured to each other by suitable fastening elements 4. The outer surface of the hub is formed of a plurality of flat sections 5 and spokes 6 formed of channel iron (see Figure 4) are secured to these sections. The spokes are equal in number to the number of flat surfaces 5 formed on the hub and are secured to these surfaces by means of bolts or rivets. The outer ends of the spokes are secured to plates 7 and these plates are arranged to form sectors of the wheel. As shown, the plates are provided with elongated slots 8 adapted to receive bolts 9 by means of which they are secured to the spokes and can be adjusted. On one side of the wheel, side plates 10 are secured to the spokes. On the opposite side of the wheel, the side plates are secured to flanges 11 carried by the plates 7. The ends of the adjacent sections of the side plates are secured to each other by means of plates 12, which are bolted or riveted to the side plates (see Figure 2). The side plates 10 extending outwardly beyond the spokes (see Figures 3 and 4) and a band consisting of a plurality of circumferentially extending wooden blocks are arranged between the side plates.

In the band wheel construction shown in Figures 5 to 8 of the drawings, the hub and spoke construction is the same. The band wheel is provided with the usual grooved pulley 14, arranged on one side thereof and bolted to the spokes of the wheel. In Figure 7 of the drawings, there is shown a detail view of the hub and the inner ends of the spokes which illustrates the construction employed in bull wheels and calf wheels, as well as in band wheels. As shown, the ends of the spokes are cut at an angle, forming an inclined surface 15, which is adapted to abut against the base or bottom 16 of the adjacent spoke (see Figure 2).

In Figure 8 of the drawings, the rim plates 7 and the spokes 6 are shown disassembled. It will be apparent that the space between the side plates 10 may be adjusted by adjusting the position of the bolts 9 in the elongated slots 8 of the rim plates. This permits taking up all shrinkage by loosening the bolts and re-tightening them after the distance between the side plates has been adjusted to overcome any shrinking of the wooden members 13.

In constructing a band wheel, the wooden members 13 are formed in arcs or segments and are arranged in staggered relation with the adjacent ends of the segments in one row arranged out of alinement with the ends of the segments of the other rows, as indicated at 17 in Figure 5 of the drawings.

In assembling or building up the wheel, the steel work is assembled in two sections or rings and the wood core constructed. After the three units are complete, they may be readily assembled.

It is to be understood that the forms of my invention herewith shown and described are to be taken as preferred forms of the same, and that various changes in the shape, size, and arrangement of parts may be resorted to without departing from the spirit of the invention or the scope of the subjoined claims.

I claim:

1. In a device of the character described, a hub, spokes secured to said hub, rim plates connected to said spokes and adapted to be adjusted laterally, a band of circumferentially extending wooden blocks arranged on said rim plates, and a pair of side plates secured to the side edges of said spokes and said rim plates respectively whereby adjustment of said rim plates will vary the distance between said side plates.

2. A device constructed in accordance with claim 1 wherein said rim plates are provided with elongated slots and are secured to said spokes by bolts passing through said slots.

3. In a device of the character described, a hub, spokes secured to said hub, said spokes being formed of angle iron, rim plates connected to said spokes, said rim plates comprising L-shaped members having elongated slots in one arm adapted to be secured to the base of said angle irons by bolts with the other arm of the rim plate arranged parallel to the side flanges of the angle irons and capable of adjustment with respect thereto, a band of circumferentially extending wooden blocks arranged on said rim plates, and a pair of side plates secured to one of said flanges of said angle iron spokes and the parallel arm of said rim plates respectively and arranged on opposite sides of said band.

In testimony whereof, I affix my signature.

THOMAS JOHN FLESHER